United States Patent
Konishi et al.

(10) Patent No.: US 6,690,928 B1
(45) Date of Patent: Feb. 10, 2004

(54) MOBILE COMMUNICATION SYSTEM FOR FORECASTING COMMUNICATION TRAFFIC

(75) Inventors: Satoshi Konishi, Saitama (JP); Hiroyuki Fukuoka, Saitama (JP)

(73) Assignee: DDI Corporation, Tokyo (JP)

( * ) Notice: Subject to any disclaimer, the term of this patent is extended or adjusted under 35 U.S.C. 154(b) by 541 days.

(21) Appl. No.: 09/678,236

(22) Filed: Oct. 4, 2000

(30) Foreign Application Priority Data

Oct. 8, 1999 (JP) ............................................ 11-288052

(51) Int. Cl.[7] ............................................ H04M 11/00
(52) U.S. Cl. .................... 455/405; 455/450; 455/452.1; 455/453
(58) Field of Search .............................. 455/450, 452.1, 455/453, 509, 517, 405, 456

(56) References Cited

U.S. PATENT DOCUMENTS 5,555,444 A * 9/1996 Diekelman et al.
5,590,395 A * 12/1996 Diekelman

OTHER PUBLICATIONS

Markoulidakis et al., "Mobility Modeling in Third–Generation Mobile Telecommunications Systems", IEEE Personal Communications, Aug. 1997.*

* cited by examiner

*Primary Examiner*—Sinh Tran
*Assistant Examiner*—Huy D Nguyen
(74) *Attorney, Agent, or Firm*—Armstrong, Kratz, Quintos, Hanson & Brooks, LLP

(57) ABSTRACT

A mobile communication system has exchange units for exchanging communication-traffic among mobile terminals, a transportation-traffic monitor for detecting transportation-traffic of the mobile terminals, and a traffic forecast unit including at least a communication-traffic forecast unit for forecasting future communication-traffic based on the detected communication-traffic and on the detected transportation-traffic.

12 Claims, 3 Drawing Sheets

MOBILE COMMUNICATION SYSTEM FOR FORECASTING COMMUNICATION TRAFFIC

FIELD OF THE INVENTION

The present invention relates to a mobile communication system for forecasting communication-traffic generated by communication terminals mounted in the vehicles on a road. In a system for suitably assigning a radio resource, such forecasted communication-traffic information will be very effective. In particular, the present invention relates to ITS (Intelligent Transportation System).

DESCRIPTION OF THE RELATED ART

In response to recent widespread use of mobile communications, the communication-traffic required for the service of the mobile communication is increasing abruptly. Conventionally, the services provided by the cellular systems or the PHS systems were only a voice service or a character service because the transmission rate in the system was very low.

In the next generation mobile communication system such as ITS or IMT-2000, however, the transmission rate becomes high, and thus the system can provide various services including image service. Particularly in ITS, the vehicle-mounted terminal can provide a large screen to present various image services including the existing navigation information service.

In the ITS, various communication-traffic such as the automatic running control information of vehicles will occur, control information required for the communication service, and general video image data and voice information. Furthermore, the amount of required communication-traffic changes due to various factors such as traffic-congestion status, road statuses (curves, tunnels, road slopes, accidents, etc.) or weather statuses.

In the ITS, cells are arranged linearly along the road, not two-dimensionally. Communications are executed between an antenna base station in each cell and vehicle-mounted terminals. However, in a DSRC (Dedicated Short-Range Communications) system which is one of communication systems between road-side radio communication system and vehicles, the distance between cell base stations is quite shorter than that of the cellular system. Generally, if a service area covered by one base station becomes large, the communication-traffic to the base station will increase and thus the large grouping effect will is obtained. Therefore, in this case, no strict forecast of the communication-traffic is necessary.

However, in case of the ITS, since the distance between the cell base stations is short, it is required to finely forecast the communication-traffic and thus improved communication quality service can be expected. In addition, extra radio resources are not provided to each station, because of the fine forecast results, therefore efficient usage of the radio resource can be attained. Furthermore, since the communication-traffic is forecasted suitably, the load of the radio resource control system can be decreased.

However, according to the conventional art, the communication-service provider forecasted the communication-traffic for each cell only from the past communication-traffic in the cell. Therefore, it was very difficult to accurately forecast the communication-traffic changed in response to various factors such as transportation-traffic or road-traffic.

SUMMARY OF THE INVENTION

It is therefore an object of the present invention to provide a mobile communication system for accurately forecasting communication-traffic changed in response to various factors such as transportation-traffic.

According to the present invention, a mobile communication system has exchange units for exchanging communication-traffic among mobile terminals, a transportation-traffic monitor for detecting transportation-traffic of the mobile terminals, and a traffic forecast unit including at least a communication-traffic forecast unit for forecasting future communication-traffic based on the detected communication-traffic and on the detected transportation-traffic.

The communication-traffic that will be changed due to various factors such as transportation-traffic can be exactly forecasted by using transportation-traffic information. The exact forecast of communication-traffic will provide suitable allocation of radio resources resulting effective usage of frequency spectrum. Also, since the radio resources are suitably allocated, the load of the system for controlling radio resources can be mitigated. Furthermore, even in the next generation communication system such as ITS which needs fine forecast of communication-traffic, it is possible to provide improved communication services.

It is preferred that the exchange unit detects communication-traffic of each mobile terminal class, and the transportation-traffic monitor detects transportation-traffic of each mobile terminal class, that the traffic forecast unit further includes a multivariate analysis unit for calculating communication-traffic of each element by multivariate-analyzing the detected communication-traffic, and a transportation-traffic forecast unit for calculating future transportation-traffic of each element based on the detected transportation-traffic, and that the communication-traffic forecast unit calculates future communication-traffic based on a relational expression of multivariate analysis with calculated future transportation-traffic of each element. The relational expression is obtained from a relationship between now and past transportation-traffic of each element and now and past communication-traffic of each element. Since communication-traffic is forecasted for each element, sufficient amount of information for forecast can be obtained resulting the reliability of the forecast to be improved.

It is preferred that the element is a principal component, a factor or a cluster, and that the multivariate analysis unit analyzes the principal component, the factor or the cluster with respect to communication-traffic of each mobile terminal class.

It is preferred that the exchange unit detects and outputs communication-traffic of each mobile terminal class, and the transportation-traffic monitor detects and outputs transportation-traffic of each mobile terminal class, that the traffic forecast unit further includes a transportation-traffic forecast unit for forecasting future transportation-traffic of each mobile terminal class based on the detected transportation-traffic, and that the communication-traffic forecast unit calculates future communication-traffic based on a relational expression and on the future transportation-traffic of each mobile terminal class calculated by the transportation-traffic forecast unit. The relational expression is obtained from a relationship between now and past transportation-traffic of each mobile terminal class and now and past communication-traffic of each mobile terminal class.

It is preferred that the traffic forecast unit further includes a transportation-traffic forecast unit for forecasting future transportation-traffic based on the detected transportation-traffic, and that the communication-traffic forecast unit calculates future communication-traffic based on a relational expression and on the future transportation-traffic calculated by the transportation-traffic forecast unit. The relational expression is obtained from a relationship between now and past transportation-traffic and now and past communication-traffic. Thus, the present invention can be applied to a case where the mobile terminal class is not stored in the radio interface for a communication or to a case where the exchange unit has no function for detecting the communication-traffic of each mobile terminal class.

It is preferred that the communication-traffic forecast unit calculates future communication-traffic based on a relational expression. The relational expression is obtained from a relationship between past transportation-traffic and now and past communication-traffic. Thereby, the system can be constituted simplest.

It is preferred that the mobile terminal class of communication-traffic includes a class of a vehicle with the mobile terminal, and a class of an area within which the mobile terminal exists, and a class of communication service provided for the mobile terminal, and that the mobile terminal class of transportation-traffic includes a class of a vehicle with the mobile terminal, and a class of an area within which the mobile terminal exists.

It is preferred that the transportation-traffic forecast unit and/or the communication-traffic forecast unit use time-series forecast scheme.

It is preferred that the system further has a forecast model renewal unit for updating a forecast model of communication-traffic in the relational expression, based on actual communication-traffic, the forecast model renewal unit cooperating with the communication-traffic forecast unit.

It is preferred that the system further has a forecast model renewal unit for updating a forecast model of transportation-traffic in the relational expression, based on actual transportation-traffic, the forecast model renewal unit cooperating with the transportation-traffic forecast unit.

It is preferred that the system further has a transportation-traffic database for storing past transportation-traffic, and a communication-traffic database for storing past communication-traffic, and that the communication-traffic forecast unit forecasts future communication-traffic based on the stored information of change.

It is preferred that the system further has a road-information acquisition unit for storing road status information including information of curves, tunnels, road slopes and accidents, and a weather-information acquisition unit for storing weather status information, and that the communication-traffic forecast unit forecasts the future communication-traffic based on the road status information and the weather status information.

Further objects and advantages of the present invention will be apparent from the following description of the preferred embodiments of the invention as illustrated in the accompanying drawings.

DESCRIPTION OF THE PREFERRED EMBODIMENTS

Figure 1:
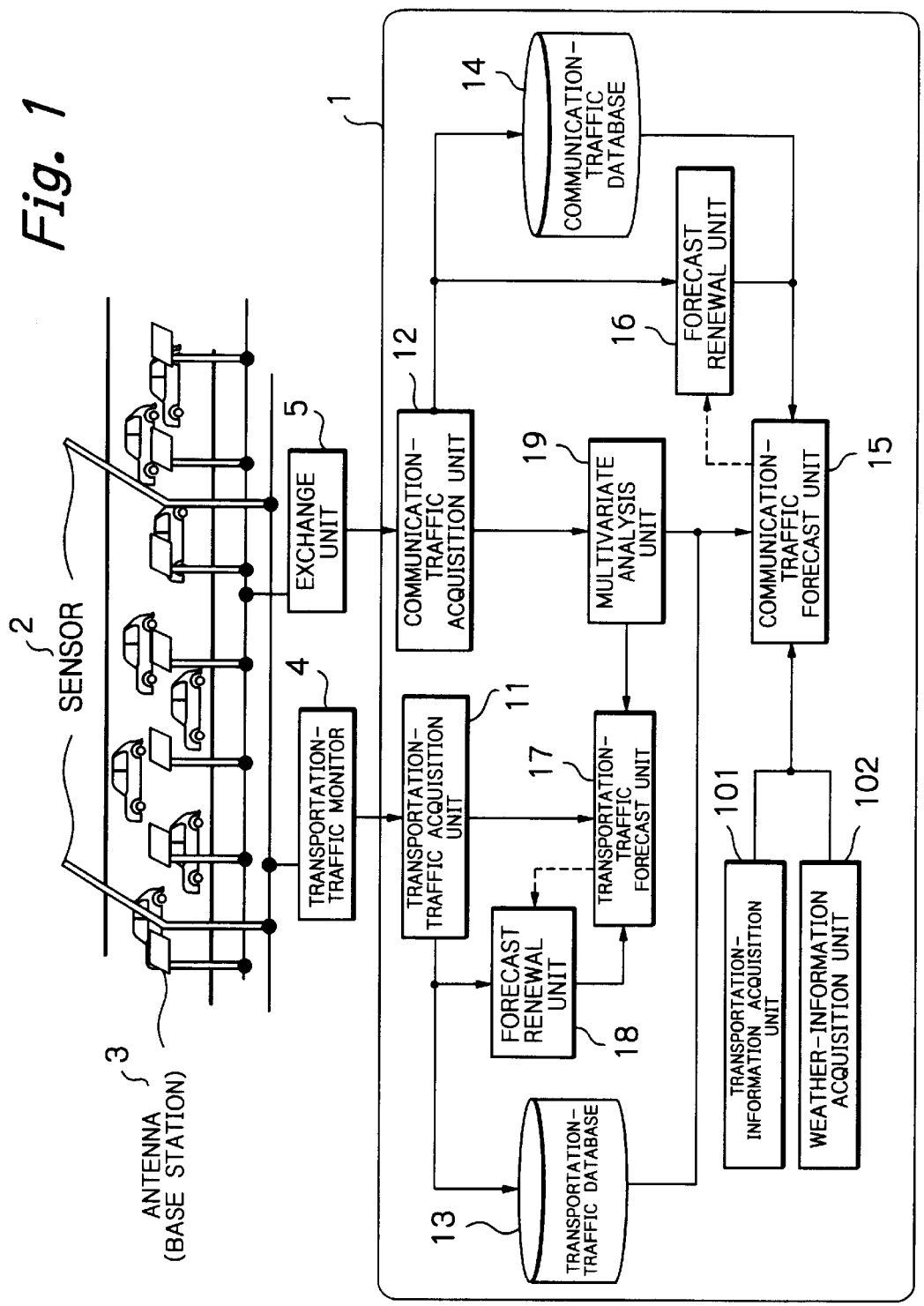
FIG. 1 schematically illustrates a block diagram of a mobile communication system in a preferred first embodiment according to the present invention.

FIG. 1 schematically illustrates a mobile communication system in a first embodiment according to the present invention.

As shown in FIG. 1, the mobile communication system is provided with sensors 2 for detecting vehicles, antennas 3 for communicating with mobile terminals mounted in the respective vehicles, a transportation-traffic monitor 4 for detecting transportation-traffic of the vehicles, an exchange unit 5 for exchanging data communicated between the mobile terminals, and a traffic forecast unit 1. The transportation-traffic monitor 4 detects the transportation-traffic of each vehicle type (each class of vehicle) and of each domain (each class of domain), and outputs these transportation-traffic data.

The exchange unit 5 detects communication-traffic (offered traffic) of each vehicle type (each class of vehicle), of each domain (each class of domain) and of each communication-service type (each class of communication service), and outputs these communication-traffic data. This is implemented by inserting information of the vehicle class, the domain class and the communication-service class, into each call information recorded in the exchange unit 5. Thereby, relationship between the transportation-traffic and the communication-traffic in each class can be constructed.

The traffic forecast unit 1 includes a transportation-traffic acquisition unit 11, a communication-traffic acquisition unit 12, a transportation-traffic forecast unit 17, a multivariate analysis unit 19 and a communication-traffic forecast unit 15. The transportation-traffic acquisition unit 11 receives time-series data of the transportation-traffic from the transportation-traffic monitor 4. The communication-traffic acquisition unit 12 receives time-series data of the communication-traffic from the exchange unit 5. The transportation-traffic forecast unit 17 forecasts future transportation-traffic based on now and past transportation-traffic. The multivariate analysis unit 19 executes multivariate-analysis for the communication-traffic, and sends the obtained communication-traffic of each class or element to the communication-traffic forecast unit 15. The communication-traffic forecast unit 15 calculates future communication-traffic based on a relational expression obtained from a relationship between now and past transportation-traffic of each element and now and past communication-traffic of each element, and on the future transportation-traffic of each element from the transportation-traffic forecast unit 17. The multivariate analysis unit 19 executes a principal component analysis, a factor analysis or a cluster analysis of the communication-traffic of each vehicle class, each domain class and each communication-service class, and then outputs each principal component, a factor or a cluster, respectively. Thereby, since not communication-traffic of each vehicle class but communication-traffic of each element is obtained, sufficient amount of information for forecasting can be provided resulting the reliability of the forecast to be improved.

The communication-traffic forecast unit 15 calculates a total communication-traffic $Y(t+1)$ at a future time $t+1$, for example, by the following multiple-regression formula; where $Y(t)$: total communication-traffic at time t, $y_i(t)$: communication-traffic of each element i (or each class i) at time t, $x_i(t)$: transportation-traffic of each element i (or each class i) at time t, $z_j(t)$: weather status information or road status information (information class j) at time t, and K: constant value.

$$y_i(t) = \sum_{i=1}^{I}\sum_{n=0}^{N} b_{in}x_i(t-n) + \sum_{j=1}^{J}\sum_{r=0}^{R} c_{jr}z_j(t-r) + K$$

$$Y(t) = \sum_{i=1}^{I} y_i(t)$$

The transportation-traffic forecast unit 17 and the communication-traffic forecast unit 15 may use the time-series forecast scheme based on for example ARIMA (Auto-Regression Integrated Moving Average) model, time-varying coefficient AR model, or FARIMA (Fractional ARIMA) model using Kalman-filter equation.

The system shown in FIG. 1 is also provided with a first forecast-model renewal unit 18 cooperated with the transportation-traffic forecast unit 17, and a second forecast-model renewal unit 16 cooperated with the communication-traffic forecast unit 15. These units 17 and 15 update a forecast model in the above-mentioned relational expression, based on actual transportation-traffic or actual communication-traffic.

The system shown in FIG. 1 is further provided with a transportation-traffic database 13 for storing the past transportation-traffic, and a communication-traffic database 14 for storing the past communication-traffic. Thereby, the communication-traffic forecast unit 15 can forecast future communication-traffic in consideration of the changes in the past traffics. The information of change may be for example variations due to day a week. On a holiday, the vehicle class will be mostly occupied by private vehicles, so that the communication information will be mostly occupied by amusement information. On the other hand, on a day other than the holiday, the vehicle class will be mostly occupied by vehicles for business use, so that the communication information will be mostly occupied by alternative traffic path information.

The system shown in FIG. 1 is further provided with a road-information acquisition unit 101 for obtaining and storing road status information, and a weather-information acquisition unit 102 for obtaining and storing weather status information. Thereby, the communication-traffic forecast unit 15 can forecast future communication-traffic depending upon actual road status and upon actual weather status. The road status information may be information of for example curves, tunnels, road slopes, accidents, etc., and the weather status information may be information such as fine weather, rainy weather, etc. According to this status information, the communication-traffic in certain location may increase rapidly. The communication-traffic forecast unit 15 may take into consideration of the road congestion status as well.

Figure 2:
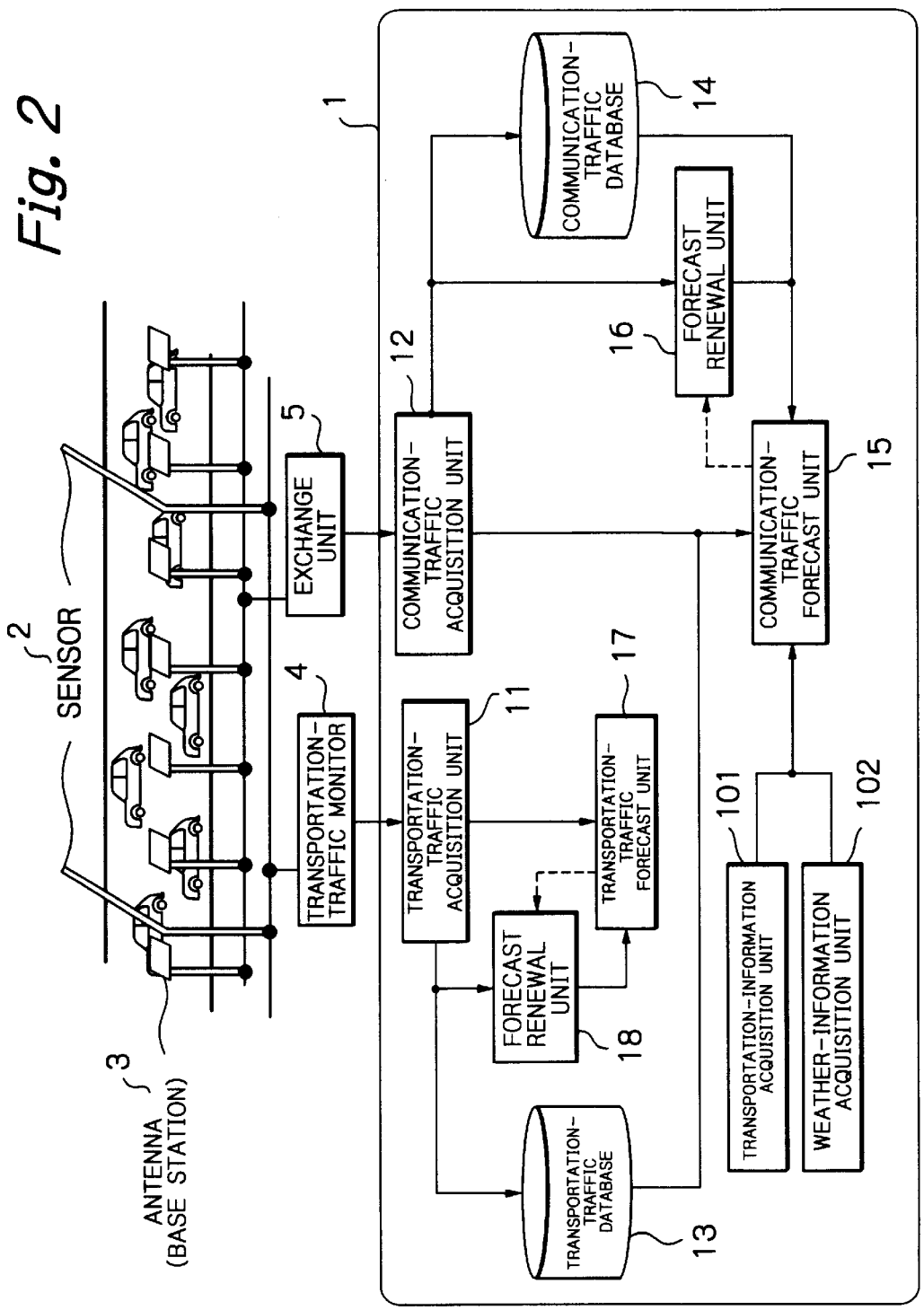
FIG. 2 schematically illustrates a block diagram of a mobile communication system in a preferred second embodiment according to the present invention.

FIG. 2 schematically illustrates a mobile communication system in a second embodiment according to the present invention.

In this second embodiment, the system has substantially the similar units as in the system of the first embodiment except that there is no multivariate analysis unit 19. Thus, in FIG. 2, the similar function units as in the first embodiment shown in FIG. 1 are indicated by using the same reference numerals.

The communication-traffic forecast unit 15 in this second embodiment calculates future communication-traffic of each vehicle class, of each domain class and of each communication-service class. Since the obtained communication-traffic is the traffic of each class, amount of information for forecasting is not enough in this embodiment. However, since no multivariate analysis unit is not necessary, it is easy to realize the system.

This second embodiment shown in FIG. 2 can be applied to a case where the class information cannot be stored in a radio air interface for communication, and also to a case where the exchange unit has no function for detecting communication-traffic of each class. The communication-traffic forecast unit 15 in the latter case calculates future communication-traffic based on a relational expression obtained from a relationship between now and past transportation-traffic of each vehicle class and now and past communication-traffic of each vehicle class, and on future transportation-traffic of each vehicle class from the transportation-traffic forecast unit 17.

Also, the second embodiment shown in FIG. 2 can be applied to the following two cases where the transportation-traffic monitor 4 has no function for detecting communication-traffic of each vehicle class.

The first case is that the transportation-traffic monitor 4 detects the transportation-traffic of each vehicle class, but the exchange unit 5 does not detect the communication-traffic of each vehicle class. In this first case, the communication-traffic forecast unit 15 will calculate the total communication-traffic Y (t+1) in a future time t+1, by the following multiple-regression formula. The transportation-traffic forecast unit 17 may calculate total transportation-traffic X(t+1) at a target time t+1.

$$Y(t) = \sum_{i=1}^{I}\sum_{n=0}^{N} b_{in}x_i(t-n) + \sum_{j=1}^{J}\sum_{r=0}^{R} c_{jr}z_j(t-r) + K$$

The second case is that neither the transportation-traffic monitor 4 nor the exchange unit 5 detects traffic of each vehicle class. In this second case, the communication-traffic forecast unit 15 will calculate the total communication-traffic Y(t+1) in a future time t+1, by the following multiple-regression formula.

$$Y(t) = \sum_{n=0}^{N} b_n X(t-n) + \sum_{j=1}^{J}\sum_{r=0}^{R} c_{jr}z_j(t-r) + K$$

Figure 3:
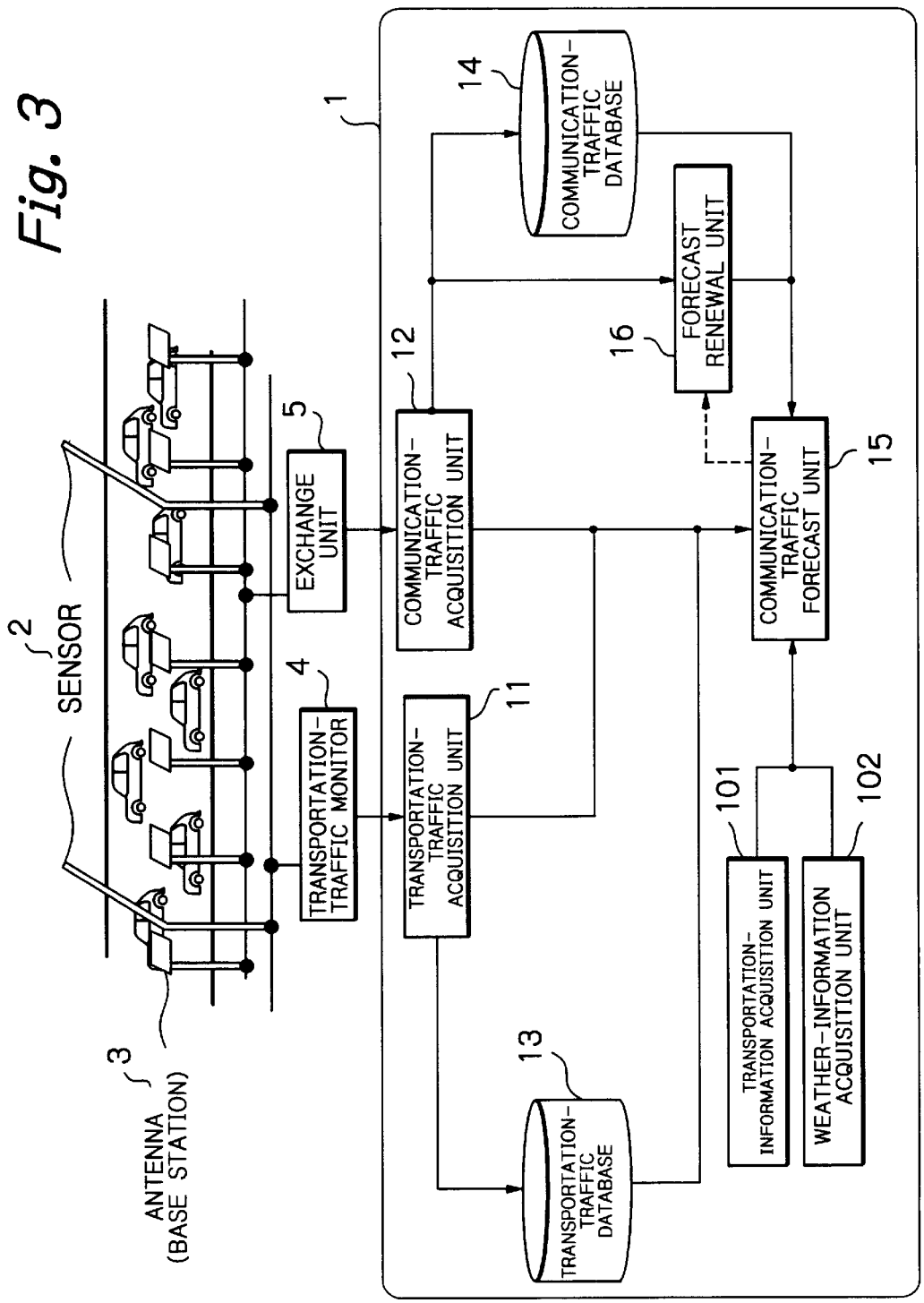
FIG. 3 schematically illustrates a block diagram of a mobile communication system in a preferred third embodiment according to the present invention.

FIG. 3 schematically illustrates a mobile communication system in a third embodiment according to the present invention.

In this third embodiment, the system has substantially the similar units as in the system of the first embodiment except that there is neither transportation-traffic forecast unit 17 nor forecast model renewal unit 18 in FIG. 2. Thus, in FIG. 3, the similar function units as in the first embodiment shown in FIG. 1 are indicated by using the same reference numerals.

The communication-traffic forecast unit 15 in this third embodiment calculates future communication-traffic based on a relational expression obtained from a relationship between now and past transportation-traffic of each vehicle class and now and past communication-traffic of each vehicle class.

In the first case where the transportation-traffic monitor 4 detects the transportation-traffic of each vehicle class but the exchange unit 5 does not detect the communication-traffic of each vehicle class, the communication-traffic forecast unit 15 will calculate the total communication-traffic Y(t) in a future time t, by the following multiple-regression formula.

$$Y(t) = \sum_{m=1}^{P} a_m Y(t-m) + \sum_{i=1}^{I} \sum_{n=1}^{N} b_{in} x_i(t-n) + \sum_{j=1}^{J} \sum_{r=1}^{R} c_{jr} z_j(t-r) + K$$

In the second where neither the transportation-traffic monitor 4 nor the exchange unit 5 detects traffic of each vehicle class, the communication-traffic forecast unit 15 will calculate the total communication-traffic Y(t) in a future time t, by the following multiple-regression formula.

$$Y(t) = \sum_{m=1}^{P} a_m Y(t-m) + \sum_{n=1}^{N} b_n X(t-n) + \sum_{j=1}^{J} \sum_{r=1}^{R} c_{jr} z_j(t-r) + K$$

In the embodiment shown in Fig.3, the communication-traffic forecast unit 15 may calculate the necessary communication-traffic based on the transportation-traffic of each vehicle class, by using MARMAX (Multiple ARMAX) scheme for example. In the case of using MARMAX, neither transportation-traffic forecast unit nor transportation-traffic database are necessary.

MARMAX is a model in which, when a variable to be obtained (output-variable y) differs from one or more usable variable (input-variable x), the relation between these variables is calculated in consideration with an external factor (noise e).

According to the present invention, the mobile terminal is not limited to a terminal mounted in a vehicle but may be a portable terminal carried by a walker for example.

Many widely different embodiments of the present invention may be constructed without departing from the spirit and scope of the present invention. It should be understood that the present invention is not limited to the specific embodiments described in the specification, except as defined in the appended claims.

What is claimed is:

1. A mobile communication system comprising:
a plurality of exchange means for exchanging communication-traffic among mobile terminals;
a transportation-traffic monitor for detecting transportation-traffic of said mobile terminals; and
a traffic forecast means including at least a communication-traffic forecast means for forecasting future communication-traffic based on the detected communication-traffic and on the detected transportation-traffic.

2. A system as claimed in claim 1, wherein said exchange means detects communication-traffic of each mobile terminal class, and said transportation-traffic monitor detects transportation-traffic of each mobile terminal class, wherein said traffic forecast means further includes a multivariate analysis means for calculating communication-traffic of each element by multivariate-analyzing the detected communication-traffic, and a transportation-traffic forecast means for calculating future transportation-traffic of each element based on the detected transportation-traffic, and wherein said communication-traffic forecast means calculates future communication-traffic based on a relational expression of multivariate analysis with the calculated future transportation-traffic of each element, said relational expression being obtained from a relationship between now and past transportation-traffic of each element and now and past communication-traffic of each element.

3. A system as claimed in claim 2, wherein said element is a principal component, a factor or a cluster, and wherein said multivariate analysis means analyzes the principal component, the factor or the cluster with respect to communication-traffic of each mobile terminal class.

4. A system as claimed in claim 2, wherein the mobile terminal class of communication-traffic includes a class of a vehicle with said mobile terminal, and a class of an area within which said mobile terminal exists, and a class of communication service provided for said mobile terminal, and wherein the mobile terminal class of transportation-traffic includes a class of a vehicle with said mobile terminal, and a class of an area within which said mobile terminal exists.

5. A system as claimed in claim 2, wherein said system further comprises a forecast model renewal means for updating a forecast model of transportation-traffic in said relational expression, based on actual transportation-traffic, said forecast model renewal means cooperating with said transportation-traffic forecast means.

6. A system as claimed in claim 1, wherein said exchange means detects and outputs communication-traffic of each mobile terminal class, and said transportation-traffic monitor detects and outputs transportation-traffic of each mobile terminal class, wherein said traffic forecast means further includes a transportation-traffic forecast means for forecasting future transportation-traffic of each mobile terminal class based on the detected transportation-traffic, and wherein said communication-traffic forecast means calculates future communication-traffic based on a relational expression and on the future transportation-traffic of each mobile terminal class calculated by said transportation-traffic forecast means, said relational expression being obtained from a relationship between now and past transportation-traffic of each mobile terminal class and now and past communication-traffic of each mobile terminal class.

7. A system as claimed in claim 1, wherein said traffic forecast means further includes a transportation-traffic forecast means for forecasting future transportation-traffic based on the detected transportation-traffic, and wherein said communication-traffic forecast means calculates future communication-traffic based on a relational expression and on the future transportation-traffic calculated by said transportation-traffic forecast means, said relational expression being obtained from a relationship between now and past transportation-traffic and now and past communication-traffic.

8. A system as claimed in claim 1, wherein said communication-traffic forecast means calculates future communication-traffic based on a relational expression, said relational expression being obtained from a relationship between past transportation-traffic and now and past communication-traffic.

9. A system as claimed in claim 1, wherein said transportation-traffic forecast means and/or said communication-traffic forecast means use time-series forecast scheme.

10. A system as claimed in claim 1, wherein said system further comprises a forecast model renewal means for updating a forecast model of communication-traffic in said relational expression, based on actual communication-traffic, said forecast model renewal means cooperating with said communication-traffic forecast means.

11. A system as claimed in claim 1, wherein said system further comprises a transportation-traffic database for storing past transportation-traffic, and a communication-traffic database for storing past communication-traffic, and wherein said communication-traffic forecast means forecasts future communication-traffic based on the stored information of change.

12. A system as claimed in claim 1, wherein said system further comprises a road-information acquisition means for storing road status information including information of curves, tunnels, road slopes and accidents, and a weather-information acquisition means for storing weather status information, and wherein said communication-traffic forecast means forecasts the future communication-traffic based on the road status information and the weather status information.

* * * * *